Figure 1:
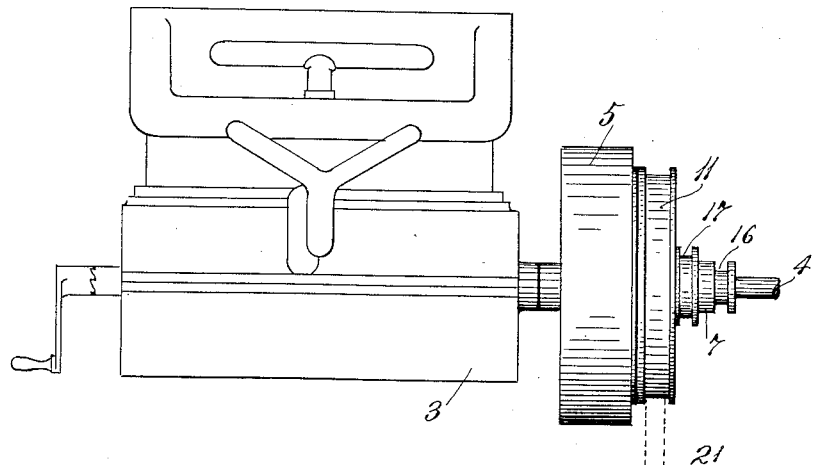

T. E. NELSON.
STARTER FOR INTERNAL COMBUSTION ENGINES.
APPLICATION FILED MAY 13, 1920.

1,434,309.

Patented Oct. 31, 1922.

Inventor
Thorwald E. Nelson
By his Attorneys
Williamson Merchant

Patented Oct. 31, 1922.                                          1,434,309

UNITED STATES PATENT OFFICE.

THORWALD E. NELSON, OF MINNEAPOLIS, MINNESOTA.

STARTER FOR INTERNAL-COMBUSTION ENGINES.

Application filed May 13, 1920. Serial No. 381,153.

*To all whom it may concern:*

Be it known that I, THORWALD E. NELSON, a citizen of the United States, residing at Minneapolis, in the county of Hennepin and State of Minnesota, have invented certain new and useful Improvements in Starters for Internal-Combustion Engines; and I do hereby declare the following to be a full, clear, and exact description of the invention, such as will enable others skilled in the art to which it appertains to make and use the same.

My invention has for its object to provide an extremely simple and highly efficient starter for internal combustion engines, and to this end, it consists of the novel devices and combinations of devices hereinafter described and defined in the claims.

In the accompanying drawings, which illustrate the invention, like characters indicate like parts throughout the several views.

Figure 2:
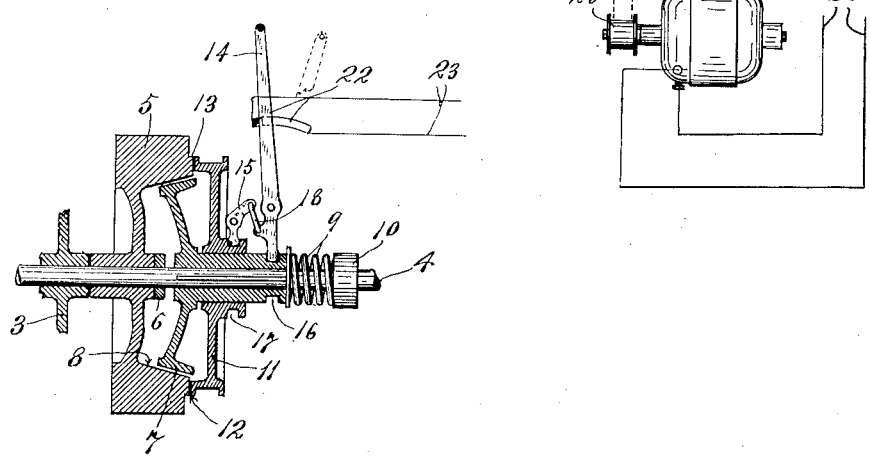

Referring to the drawings:

Fig. 1 is a view in side elevation of an internal combustion engine having the invention applied thereto; and Fig. 2 is a view principally in longitudinal central section.

The numeral 3 indicates an internal combustion engine as an entirety, with the exception of its crank shaft 4 and fly-wheel 5, said fly-wheel being loosely mounted on the crank shaft with freedom for rotation in respect thereto but held against axial movement by the crank case and a collar 6 on said shaft. Keyed to the crank shaft 4 is a friction clutch member 7 arranged for co-operation with an internal friction surface 8 on the fly-wheel 5 for connecting said fly-wheel to the crank shaft 4.

The friction clutch member 7 is yieldingly held in engagement with the friction surface 8 on the fly-wheel by a coil spring 9 compressed between the hub of said clutch and a collar 10 on the crank shaft 4. Loosely journaled on the hub of the friction clutch 7 is a relatively large pulley 11 having a friction face 12 arranged for co-operation with a friction surface 13 on the fly-wheel 5. To simultaneously release the clutch member 7 against the tension of the spring 9 and move the pulley 11 axially to connect the same to the fly-wheel 5, there is provided a pair of intermediately fulcrumed levers 14 and 15, the short ends of which extend into annular grooves 16 and 17 formed, respectively, in the hubs of the clutch 7 and pulley 11. A link 18 connects the long end of the lever 15 to the short end of the lever 14, so that said lever 15 is simultaneously moved with the lever 14.

The numeral 19 indicates a small electric motor having on its armature shaft a relatively small pulley 20 aligned with the pulley 11. A belt 21, diagrammatically indicated by broken lines, is arranged to run over the pulleys 11 and 20 to rotate the fly-wheel 5 from the motor 19 at a reduced speed. Both of the pulleys 11 and 20 have peripheral grooves, in which the belt 21 runs.

The numeral 22 indicates the contacts of a normally open switch for the motor 19. Wires 23 connect the contacts 22 to the terminals of the motor 19. The lever 14 is arranged for co-operation with the contacts 22 and affords the movable member of a switch to connect said contacts and thereby complete the circuit through the wires to start the motor, when said lever is moved into a position to release the clutch member 7 and connect the pulley 11 to the fly-wheel 5. Normally, the clutch member 7 will be set to connect the fly-wheel 5 to the engine crank shaft 4, and the pulley 11 will be out of engagement with the fly-wheel 5. The lever 14 will also be in a position, as indicated by dotted lines in Fig. 2, to break the circuit between the contacts 22.

To start the motor, the lever 14 is moved from its dotted line position to its full line position, as shown in Fig. 2. This movement of the lever 14 will release the clutch and move the pulley 11 into a position to carry its friction face 12 into engagement with the friction surface 13 on the fly-wheel 5 and thereby connect said fly-wheel to the pulley 11. This same movement of the lever 14 completes the circuit between the contacts 22 and starts the motor 19, which rotates the fly-wheel 5 on the crank shaft 4 through the pulley 11 and belt 21.

When the motor has obtained its full speed, the lever 14 may be moved from its full line to its dotted line position, as shown in Fig. 2, to disconnect the pulley 11 from the fly-wheel 5 and set the clutch member 7, thereby connecting said fly-wheel to the crank shaft 4. This same movement of the lever 14 breaks the circuit to the motor 19 and thereby stops the same. At the time the driving connections from the motor 19 to the fly-wheel 5 is broken and said fly-wheel connected to the crank shaft 4, the momentum of the fly-wheel is sufficient to turn the crank shaft and thereby start the internal combustion engine.

The above described invention, while intended for general use, is especially adapted for use in connection with the engines of motor trucks and tractors.

In some instances, it might be desirable to use a hand crank in place of a motor.

What I claim is:

1. The combination with an internal combustion engine having a crank shaft, of a fly wheel, a motor, a clutch for connecting the fly wheel to the crank shaft, a driving connection from the motor to the fly wheel for driving the same at a lower speed than the speed of the motor, and means for withdrawing the clutch to disconnect the fly wheel from the crank shaft and simultaneously connect said motor to said fly wheel.

2. The combination with an internal combustion engine having a crank shaft, of a fly wheel, an operating device, a clutch means for connecting the fly wheel to the engine crank shaft, a pulley wheel adjacent the fly wheel and adapted to be moved to frictionally engage the same, and a driving means for connecting the pulley to the operating device.

3. The combination with an internal combustion engine having a crank shaft, of a fly wheel, a motor, a switch means for connecting the fly wheel to the engine crank shaft, a pulley wheel adjacent to the fly wheel and adapted to be moved to frictionally engage the same, a common means for moving said pulley and starting and stopping said motor, and a driving connection extended from said motor to the said pulley wheel.

4. The combination with an internal combustion engine having a crank shaft, of a fly-wheel, an operating device, a friction clutch keyed to the crank shaft, a spring under strain to move the friction clutch into engagement with the fly-wheel, a wheel having a friction face arranged for co-operation with the friction face on the fly-wheel to connect the same thereto, lever-actuated connections for moving the clutch out of engagement with the fly-wheel and for moving the wheel into a position to connect the same to the fly-wheel, and a driving connection from the operating device to the wheel.

5. The combination with an internal combustion engine having a crank shaft, of a fly-wheel, a motor having a normally open switch, a friction clutch keyed to the crank shaft, a spring under strain to move the friction clutch into engagement with the fly-wheel, a wheel having a friction face arranged for co-operation with the friction face on the fly-wheel to connect the wheel thereto, lever-actuated connections for moving the clutch out of engagement with the fly-wheel, for moving the wheel into a position to connect the same to the fly-wheel, and for closing the switch of the motor, and a driving connection from the motor to the wheel.

6. The combination with an internal combustion engine having a crank shaft, of a fly wheel, a motor having a normally open switch, a frictional clutch splined to the crank shaft, a spring under strain to move the frictional clutch into engagement with the fly wheel, a pulley wheel having a frictional face arranged for co-operation with the frictional face of the fly wheel, a driving connection from the motor to said pulley wheel and a lever operator adapted to simultaneously move the clutch out of engagement with the fly wheel and engage the pulley wheel with the fly wheel and close the switch of the motor.

7. The combination with an internal combustion engine having a crank shaft, a fly wheel adapted to be connected to and disconnected from said crank shaft, a member adapted to be moved to engage and drive said fly wheel, a motor, and means extended from said motor adapted to drive said last mentioned member, and a single means adapted to be moved to move said movable member and to start and stop said motor.

In testimony whereof I affix my signature,

THORWALD E. NELSON.